US008812563B2

(12) United States Patent
Zaitsev (10) Patent No.: US 8,812,563 B2
(45) Date of Patent: Aug. 19, 2014

(54) SYSTEM FOR PERMANENT FILE DELETION (75) Inventor: Oleg V. Zaitsev, Smolensk (RU)

(73) Assignee: Kaspersky Lab, ZAO, Moscow (RU)

(*) Notice: Subject to any disclaimer, the term of this patent is extended or adjusted under 35 U.S.C. 154(b) by 420 days.

(21) Appl. No.: 12/906,768

(22) Filed: Oct. 18, 2010

(65) Prior Publication Data
US 2011/0219049 A1 Sep. 8, 2011

(30) Foreign Application Priority Data

Mar. 2, 2010 (RU) ................................ 2010107434

(51) Int. Cl.
G06F 17/30 (2006.01)
G06F 21/62 (2013.01)
G06F 3/06 (2006.01)

(52) U.S. Cl.
CPC .......... G06F 3/0623 (2013.01); G06F 21/6218 (2013.01); G06F 2221/2143 (2013.01); G06F 17/30117 (2013.01); G06F 3/0671 (2013.01); G06F 3/0652 (2013.01)
USPC ........................................................ 707/822

(58) Field of Classification Search
CPC ... G06F 3/0623; G06F 3/0652; G06F 3/0671; G06F 17/30117; G06F 2221/2143; G06F 21/6218
USPC ........................................................ 707/822
See application file for complete search history.

(56) References Cited

U.S. PATENT DOCUMENTS 16,132 A 11/1856 Wright
30,755 A 11/1860 Perley
5,265,159 A 11/1993 Kung
6,507,911 B1 1/2003 Langford
7,228,379 B2 6/2007 Bress et al.
7,275,139 B1 9/2007 Tormasov et al.
7,475,203 B1 * 1/2009 Petrillo et al. ................ 711/159
7,512,812 B2 3/2009 Sohn
8,023,751 B1 * 9/2011 Reisman ....................... 382/232
2003/0051055 A1 * 3/2003 Parrella et al. ............... 709/246
2004/0006715 A1 1/2004 Skrepetos (Continued)

FOREIGN PATENT DOCUMENTS

GB 2432928 6/2007
WO WO0248847 6/2002
WO WO2008135078 11/2008
WO WO 2008135078 11/2008

OTHER PUBLICATIONS

Search report in EP 10188307 dated May 20, 2011.

Primary Examiner — Etienne Leroux
Assistant Examiner — Jared Bibbee
(74) Attorney, Agent, or Firm — Bardmesser Law Group (57) ABSTRACT A system for permanent data deletion is provided. The file deletion system consists of a permanent deletion unit, an analysis module, a database of rules for forming deletion algorithm and an algorithm forming unit. A file to be deleted is passed into the system and the system permanently deletes the file. The system dynamically forms the deletion algorithm based on algorithm forming rules. The rules are selected from the database according to file parameters and user criteria. The file parameters are determined by the analysis module. A user has an access to algorithm forming rules and can edit the rules. Algorithm forming rules can be based on an arbitrary number of complex conditions.

16 Claims, 5 Drawing Sheets

(56) References Cited

U.S. PATENT DOCUMENTS

| | | |
|---|---|---|
| 2006/0026222 A1* | 2/2006 | Wu .............................. 707/205 |
| 2006/0200357 A1 | 9/2006 | Dewey |
| 2008/0101508 A1 | 5/2008 | Oh et al. |
| 2008/0300965 A1* | 12/2008 | Doe ............................... 705/10 |
| 2009/0100212 A1 | 4/2009 | Boyd |
| 2009/0313702 A1* | 12/2009 | Mandava ....................... 726/27 |
| 2010/0023538 A1* | 1/2010 | Kreiner et al. ................ 707/101 |
| 2010/0281080 A1* | 11/2010 | Rajaram et al. ............... 707/813 |

* cited by examiner

SYSTEM FOR PERMANENT FILE DELETION

CROSS-REFERENCE TO RELATED APPLICATIONS

This application claims priority to Russian Utility Model Application No. 2010107434, filed on Mar. 2, 2010, which is incorporated herein by reference in its entirety.

BACKGROUND OF THE INVENTION

1. Field of the Invention

The present invention is related to methods for deleting file data, in particular, to permanent deletion of files without possibility of restoration.

2. Description of the Related Art

Typically, user data is stored on a rewritable storage. In case of a PC, rewritable data storage is implemented on a hard magnetic disk (i.e., HDD) or as a Flash memory (i.e., SSD storage). These storage devises are currently used in all computers. In addition to writing and reading user data in and out of a data storage an important issue is deleting the data when it is no longer needed by the user.

In Windows and DOS systems, files are deleted by standard OS means. Typically, a file is deleted from a list of files located on a disk. Then, clusters used for the file are marked as free. However, the clusters used for storing the file are not physically cleaned. In NTFS file system, MFT cell containing file-related metadata is also not cleaned out. Therefore, the deleted file becomes invisible, but data related to this file remains on the storage for some time.

While the file-related data remains on a hard disk, the space occupied by the deleted file is available for writing new data into it. When a new data is written into the space occupied by the data related to the deleted file, the file is lost and cannot be restored. In case of formatting of a logical disc, when a file is deleted, a table of file locations is recreated. New location table indicates that the disk is empty in the areas previously occupied by the deleted file.

However, file-related data at these locations is intentionally not erased. If this data is not overwritten by new data after formatting, the data of the deleted file can be recovered by special applications. When logical partitions are deleted (or created), a new partition table is created. New disks are considered empty, while old data mostly remains in its locations on the disks. However, this data cannot be accessed by standard OS means.

The data on the hard disk can be restored by special utilities that implement sector-by-sector read of a storage device analyzing logical structures of the disk. Thus, lost file data can be found and retrieved. In case when all file-related metadata is lost, special utilities can analyze suspected file content read from the disk. For example, some files (images, documents, etc.) have specific headers. This allows for recovering these files without any data about location and size of the file.

Currently, mobile storage devices, such as USB Flash Drives and various memory sticks or cards are widely used. When one of these devices is sold or given from one user to another, a user can unintentionally provide some of his personal data that still remains on the mobile storage device after the files have been deleted.

However, an ability to recover accidently deleted data is very important. At the same time the ability to recover deleted data by people with malicious intents can have a very negative impact. This is especially true as it comes to trade secrets, financial data, passwords, etc.

In order to permanently delete a file and to make sure that this file will not be recovered, special applications called "shredders" are employed. All existing shredders work in a similar manner. File content is erased (i.e., overwritten) by some senseless data, such as, for example, by zeros or by random byte sequences. There are several algorithms used for erasing of data. These algorithms differ by a number of passes over the file data and by a type of data written over the file data.

The simpler the algorithm, the less time it requires for deleting data. However, a probability of restoration of data is higher for simple algorithms. Multi-pass erasing of data needs to be used only for hard disks, because after one-pass-deletion sufficient magnetism remains, that allows for restoration of the erased data by employing special methods. Therefore, the more data overwriting cycles are used, the harder it is to restore the file data. Flash drives require just one pass for permanent deletion of data.

Conventional shredders have a number of disadvantages. The shredders cannot automatically choose a data erasing algorithm. A common data erasing algorithm is selected manually by a user. The selected algorithm is used on all types of objects. The user cannot create own algorithms. None of the conventional shredders provide for centralized control.

A system for data deletions is disclosed in U.S. Pat. No. 5,265,159. Deleted information is encrypted and cannot be read even if restored. This system does not overwrite the data. The disadvantage of such system is an encryption key, which can end up in the hands of a party interested in the deleted data. The data can be restored and easily decrypted and read.

U.S. Pat. No. 7,228,379 discloses a system for permanent deletion of a file. The data deletion system is connected to a data storage device. The deletion system sends a command for permanent deletion to the data storage device. Then, zeros or random byte sequences are written on the data storage. Such system has a number of shortcomings. For example, the data deletion system can be connected to the data storage device only via IDE interface. The entire data is erased from the data storage. The data deletion device requires a separate power supply. The system does not provide for selection of data deletion algorithm.

U.S. Pat. No. 7,228,379 discloses a system for permanent deletion of a file data. This system creates a bitmap of blocks, clusters, and sectors of a data storage device. The bitmap contains information about unused blocks, clusters, and sectors of a data storage device that need to be overwritten by random data or deleted by a known permanent deletion algorithm. Then, the bitmap is updated to reflect the overwritten data. However, the disclosed system does not provide for dynamic generation of the deletion algorithm based on parameters of the file being deleted, location of this file and user criteria.

Accordingly, there is a need in the art for a system for effective permanent deletion of files that dynamically employs different deletion algorithms based on objects being deleted.

SUMMARY OF THE INVENTION

The present invention is related to methods for permanent data deletion. The present invention provides a data deletion system for permanent data deletion using a dynamically formed deletion algorithm that substantially obviates one or several of the disadvantages of the related art.

In one aspect of the invention a system for permanent data deletion is provided. According to an exemplary embodiment, the file deletion system consists of a permanent deletion unit, an analysis module, a database of rules for forming deletion algorithm and an algorithm forming unit. A file to be deleted is passed into the system, and the system permanently deletes the file. The system dynamically forms the deletion algorithm based on algorithm forming rules. The rules are selected according to file parameters, such as, file extension, file size, file location, data storage type, data storage speed, etc.

The file parameters are determined by the analysis module. The deletion rules are also based on user criteria, such as, for example, processing speed, priority of permanent deletion process, determination of file extensions, file types and directories that are important for a user. A user has an access to algorithm forming rules and can edit the rules. Algorithm forming rules can be based on an arbitrary number of complex conditions.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, a method and system for permanent deletion of files are provided. The system of the exemplary embodiment employs a permanent deletion unit, an analysis module and a database of rules for forming deletion algorithm and an algorithm forming unit. The number of rules can be arbitrarily large (e.g., from a simple rule such as "if the file extension is .avi, then . . . " to more complex rules that take into account file size, extension, location, name, etc. Generally, a rule is in the form of "if <condition> then <action>", with both conditions and actions being arbitrarily simple or complex.

The database can also contain the steps of the algorithm itself, for implementing the deletion. A file to be deleted is passed into the system, and the system permanently deletes the file. The system dynamically forms the deletion algorithm based on algorithm forming rules derived from the database. Each algorithm is a procedure or a formula, which is tied to the database. The rules are selected according to file parameters: file extension, file size, file location, data storage type and data storage speed. Other parameters can include, for example, file name (or portion of a name).

The file parameters (which are the properties of the file, such as file name, file type, file size, location, image/video resolution, etc.) are determined by the analysis module. The rules are also selected based on user criteria (essentially, user preferences), such as, for example, processing speed, priority of permanent deletion process, determination of file extensions, file types and directories that are important for a user. A user has an access to algorithm forming rules and can edit the rules. Note that algorithm forming rules can be based on an arbitrary number of complex conditions. The number of rules depends on the user preferences, and can be anywhere from one or two to hundreds—for example, a use can define rules for a particular folder, a group of folders, file types, etc.

Figure 1:
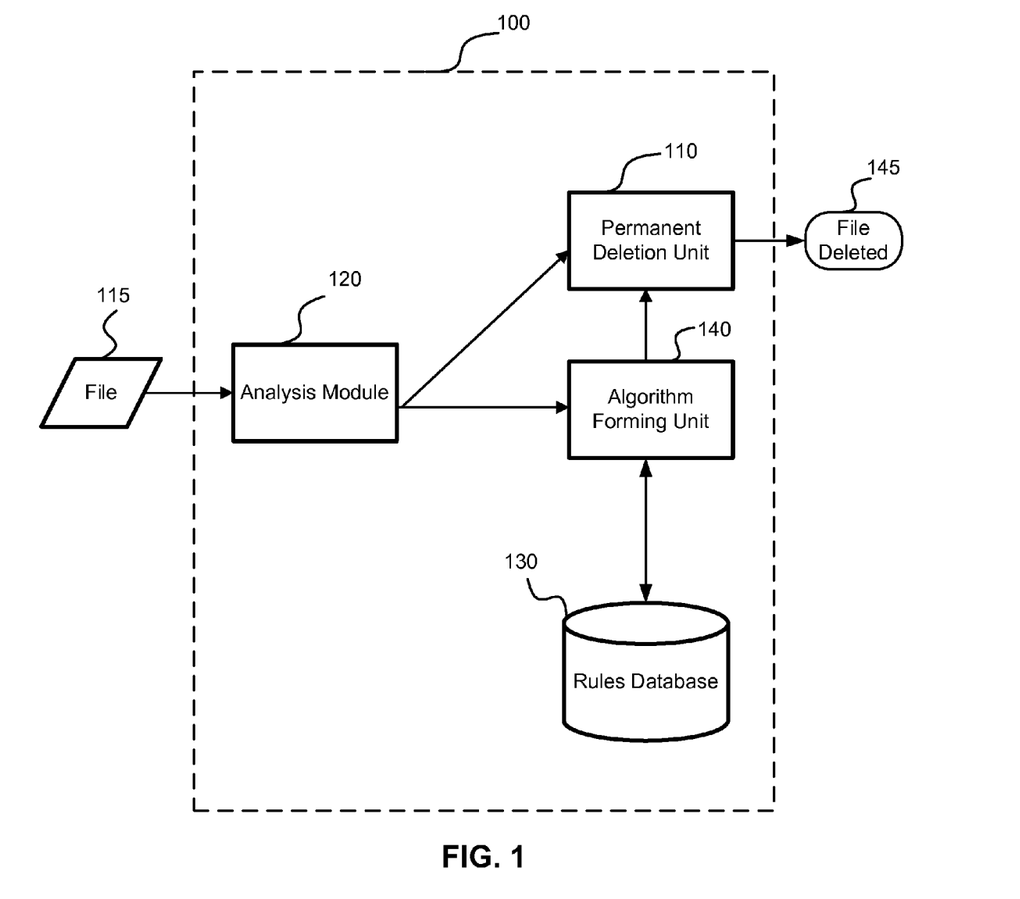
FIG. 1 illustrates a system for permanent file deletion, in accordance with the exemplary embodiment.

FIG. 1 illustrates a system for permanent file deletion, in accordance with the exemplary embodiment. A permanent file deletion system 100 receives the file 115 to be deleted and the file 115 is permanently deleted (see block 145). Analysis module 120 analyses the file 115 and determines file parameters and location of the file. This information is passed on to an algorithm forming unit 140. Also, the analysis module 120 informs a permanent deletion unit 110 that the file 115 exists and needs to be permanently deleted.

After that permanent deletion unit 110 waits for a deletion algorithm to be formed by the algorithm forming unit 140. The algorithm forming unit 140 matches the file parameters (and file location) received from the analysis module 120 against algorithm forming rules located in a rules database 130. Then, using rules appropriate for given file parameters and location, the algorithm forming unit 140 forms a file deletion algorithm. The algorithm forming unit 140 forms a file deletion algorithm also based on user criteria located in the database 130.

As soon as the deletion algorithm is generated by the algorithm forming unit 140, the algorithm is passed to the permanent deletion unit 110. The permanent deletion unit 110 executes the deletion algorithm and permanently deletes the file 115. According to the exemplary embodiment, the detection algorithm implements a standard set of operations, such as overwriting file data with zeros or ones, overwriting by random symbols, truncating the file length to a zero size, removing file privileges (i.e., making file accessible for write operations) and file removal. The user can either select a standard algorithm, or create his own using the described system.

The algorithm forming unit 140 dynamically forms the deletion algorithm based on special formula that can form a different algorithm for each file. Each symbol in the formula represents a certain operation. In the exemplary embodiment, the following codes for operations are used:

E—performs file existence check. If the file does not exist, the further processing is terminated;

0—performs overwriting of the file content with zeros (i.e., with bytes coded as 0x00);

1—performs overwriting of the file content by ones (i.e., with bytes coded as 0xFF);

5—performs overwriting of the file content by alternating 0 and 1 (i.e., with bytes coded as 0x55);

6—performs overwriting of the file content by alternating 1 and 0 (i.e., with bytes coded as 0xAA);

R—performs overwriting of the file content by random symbols;

B( )—performs overwriting of the file content by a sequence of symbols;

A—matches the file size to a size that equals to a multiple of a cluster rounded to a larger side (in order to definitely erase data of the last cluster);

Z—matches the file size to a size that equals to a multiple of a cluster rounded to a smaller side (in order to definitely erase data of the last cluster) and the difference is filled with zeros;

N—inverses all byte of the file (logical NOT operation). For this operation, the file content is read from the disk and the bytes that have been read are inversed and written to the file;

K—replaces all bytes of the file by additional codes. For this operation, the file content is read from the disk and for the bytes that have been read additional codes are calculated and the result is written to the file;

T—truncates the file length to zero size;

C—creates a file of a zero size. If the file exists, its size is reduced to zero (analogous to T);

X—performs full procedure for file removal including delayed removal;

Y—performs renaming of the file. New name and extension are formed as a random sequence of symbols in "8.3" format. This operation can be invoked a number of times;

F—opens the file and flashes its caches;

P—removes all privileges making file accessible to all user for all operations;

S—flashes all disk caches containing the file being deleted. This operation is useful after renaming and removal of the file (system caches catalog indexes and MTF cells);

According to the exemplary embodiment, the algorithm forming unit 140 can form known algorithms, such as:

1. Fast permanent file removal—"E 0 TX" or "E R TX".

Fast permanent removal can be implemented in various utilities and generally performs one pass deletion of file content by filling it with zeros or random symbols. This operation is sufficient in most of the cases and can be performed fast.

2. Russian standard GOST P50739-95—"E R TX".

According to this standard, the file content is overwritten by random values.

3. Bruce Schneider Algorithm—"E 10 RRRRR TX". According to Schneider deletion method consists of seven operations—overwriting with logical ones and zeros and five passes of overwriting by sequences of random bytes;

4. German standard VSITR—"E 01 01 01 6 TX".

The German standard consists of seven operations—three cycles of overwriting by zeros and ones, overwriting the file content by alternating ones and zeros, truncating the file to zero size and removal.

Other algorithms that can be used are: American standards NAVSO P-5239-26 (MFM), NAVSO P-5239-26 (RLL), 5220.22-M, AFSSI5020. Also, Peter Gutman algorithm can be used. This algorithm performs 35 passes for permanent file deletion. Note, that the algorithm forming unit 140 of the exemplary embodiment can use any of the deletion algorithms in any combination depending on file parameters and user criteria.

Figure 2:
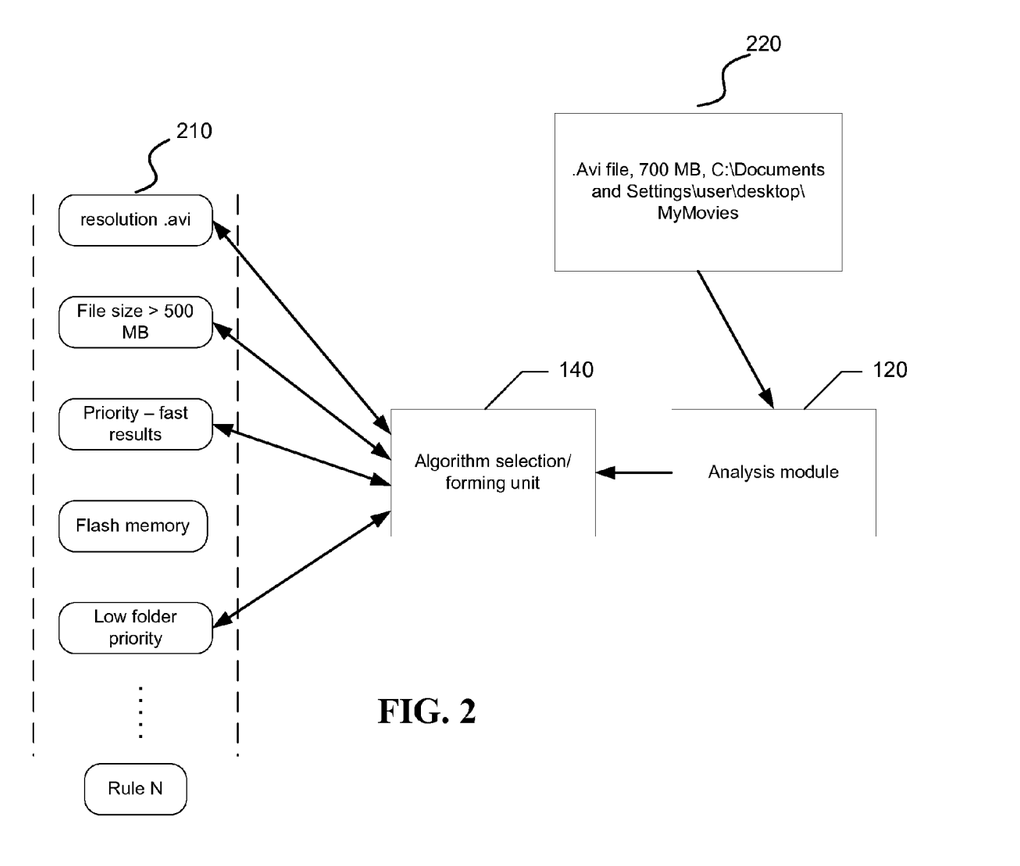
FIG. 2 illustrates how analysis module communicates with algorithm unit using algorithm forming rules, in accordance with the exemplary embodiment.

FIG. 2 illustrates how analysis module communicates with algorithm forming unit using algorithm forming rules, in accordance with the exemplary embodiment. An exemplary file 220 with extension ".avi" and size 700 Mb is located at C:\Documents\User\Work desk\My movies needs to be permanently deleted. User preferences (criteria) for this directory are low importance and high processing speed. (Note that this criterion can apply not just to a particular directory but to all files being deleted.) Analysis module 120 analyses the file and determines file parameters and location of the file. This information is provided to an algorithm forming unit 140. The algorithm forming unit 140 matches the file parameters (and file location) received from the analysis module 120 against algorithm forming rules 210. Then, using rules appropriate for given file parameters and location and user preferences (criteria), the algorithm forming unit 140 forms the file deletion algorithm. For example, an .avi file with a large size has certain rules selected for it, e.g., based on its size, resolution. The algorithm forming unit 140 then receives these rules), analyzes the relevant data (and any user-defined rules that might have priority over other rules, the rules selected based on other criteria, and forms the final algorithm to be used.

In the example depicted in FIG. 2, rules 1, 3, 4 and 5 are used for forming the deletion algorithm for deletion of the file 220.

Figure 3:
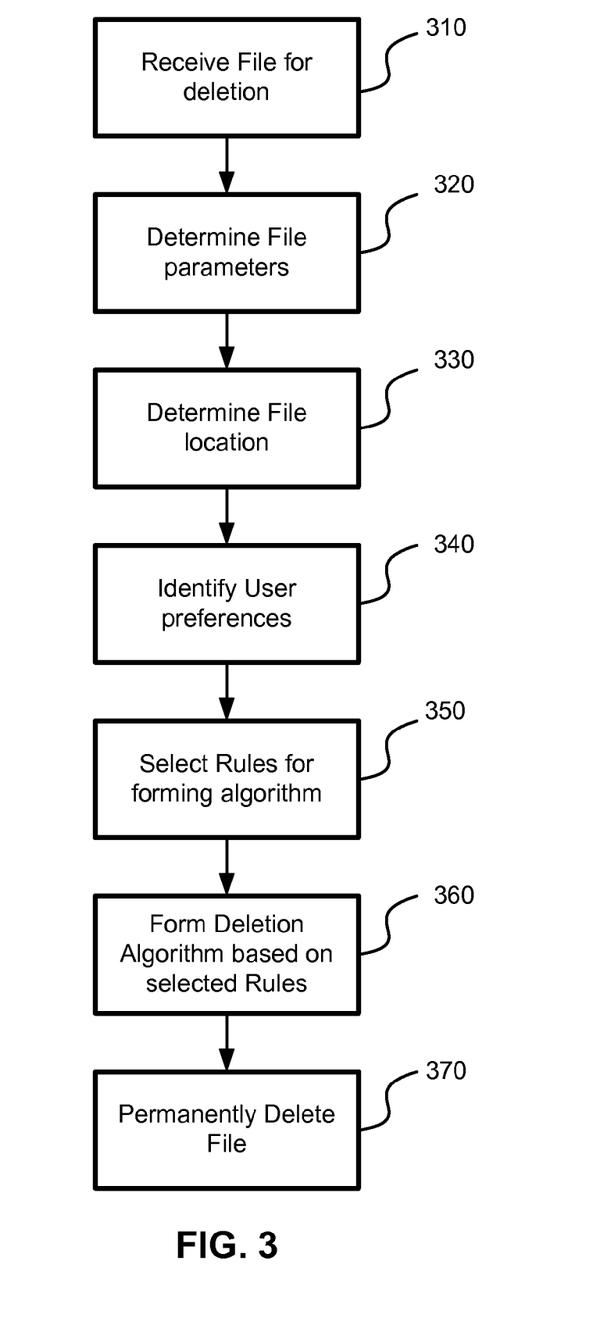
FIG. 3 illustrates a method for selecting rules for forming deletion algorithm, in accordance with the exemplary embodiment.

FIG. 3 illustrates a method for selecting rules for forming deletion algorithm, in accordance with the exemplary embodiment. A file to be permanently deleted is received in step 310. The file is analyzed and file parameters are determined in step 320. Using the exemplary file depicted in FIG. 2, it is determined that the file has extension ".avi" and has the size of size 700 Mb. In step 330, file location is determined. For the exemplary file, it is C:\Documents\User\Work desk\My movies.

User preferences are identified in step 340. In step 350 algorithm forming rules are selected from the rule database and file deletion algorithm is formed in step 360 based on the selected rules. The algorithm is applied to the file in step 370 and the file is permanently deleted.

Figure 4:
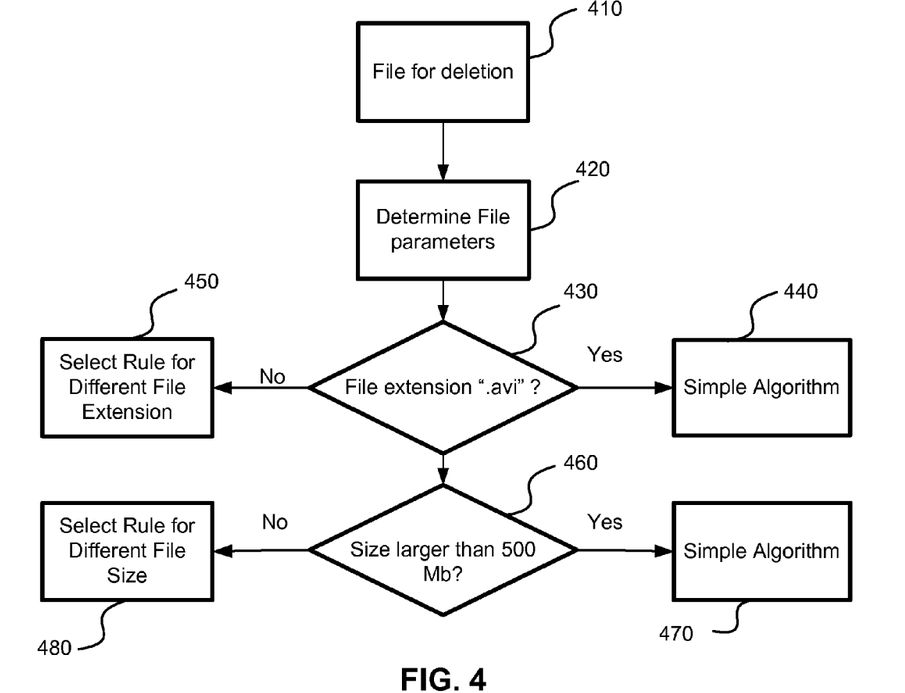
FIG. 4 illustrate selection of deletion rules for an exemplary file.

FIG. 4 illustrates selection of deletion rules for an exemplary file. For the exemplary file, the logic for using appropriate rules can be as following. The file for deletion 410 is analyzed in step 420. If the file extension is ".avi" in step 430, the file does not require a complex algorithm for permanent deletion of this file and a simple algorithm is used (see step 440). Otherwise, a different rule for a different file extension is selected in step 450.

A permanent deletion of a file over 500 Mb by a complex algorithm can take up a long time. The given file size is larger than 500 Mb (see 460). Therefore, in this case, if in step 460 it is determined that the file has a size larger than 500 MB a rule corresponding to a simple algorithm 470 for these file sizes is selected. Otherwise, a different rule is selected for a different file size (see step 480).

According to the exemplary embodiment, the rule database contains rules based on user criteria. The user has access to these rules and can edit them based on his preferences. The user can also add his proprietary formula into deletion rules used for forming the deletion algorithm. The user formula is based on coded operations supported by the deletion system. This deletion rule containing a user formula has priority over other algorithm forming rules that are based on the file parameters, file location and user criteria.

As one example, if in step 420, it is also determined that the file size exceeds 500 MB and the file extension is ".avi", the appropriate rule for this file size and this file extention will be also selected taking in consideration user criteria. In this example, for the directory C:\Documents\User\Work desk\My movies the user set a low importance and high processing speed criteria.

The algorithm forming unit can generate deletion algorithm based on the user formula. However, if the algorithm generated based on the user formula is simpler than the algorithm required by the file parameters and the user criteria, the algorithm forming unit automatically generates more complex algorithm based on the file parameters and the user criteria.

According to the exemplary embodiment, the rule database is constantly updated. Thus, the permanent deletion system has a current set of algorithm forming rules that are selected based on the file parameters, the file location and the user criteria.

In another exemplary embodiment, permanent file deletion is performed based on mask. The analysis module 120 searches through a given directory for files corresponding to a given mask and these files are deleted. Alternatively, the analysis module searches through all directories starting from a given one for files corresponding to a given mask. Then, these files are permanently deleted. After deletion of files, the directory is checked for any other files. If there are no files left in the directory, the directory is also deleted.

Those skilled in the art will appreciate that the exemplary embodiment, advantageously, provides for effective deletion of files using dynamically formed deletion algorithms without possibility of restoration of the deleted files.

Figure 5:
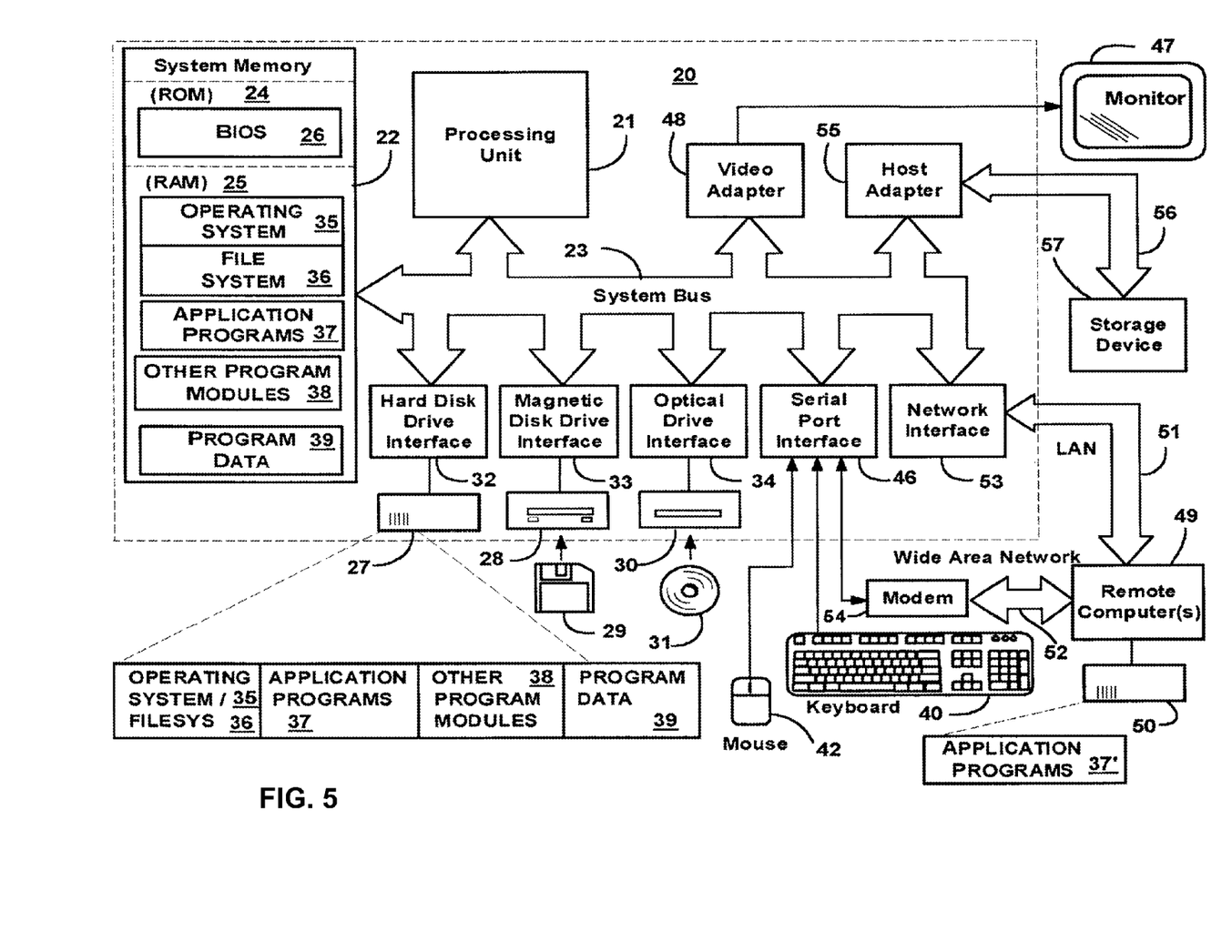
FIG. 5 illustrates a schematic of an exemplary computer system that can be used for implementation of the invention.

With reference to FIG. 5, an exemplary system for implementing the invention includes a general purpose computing device in the form of a computer or server 20 or the like, including a processing unit 21, a system memory 22, and a system bus 23 that couples various system components including the system memory 22 to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk 27, a removable magnetic disk 29 and a removable optical disk 31, it should be appreciated by those skilled in the art that other types of computer readable media that can store data that is accessible by a computer 20, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 27, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for an effective deletion of files without possibility of restoration.

It should also be appreciated that various modifications, adaptations and alternative embodiments thereof may be made within the scope and spirit of the present invention. The invention is further defined by the following claims.

What is claimed is:

1. A computer-implemented system for permanent deletion of a file data, the system comprising:
   a processor;
   an analysis module, running on the processor, for determining parameters and location of a file to be deleted;
   an algorithm forming unit for automatically forming a deletion algorithm, wherein different deletion algorithms are formed depending on user-specified criteria, file location and file parameters;
   a rules database implemented for storing deletion rules;
   a permanent deletion unit for deleting the file data, wherein:
   the algorithm forming unit compares the parameters acquired from the analysis module with deletion rules from rules database to select the appropriate deletion rules;
   the algorithm forming unit forms a deletion algorithm in compliance with selected deletion rules; and the permanent deletion unit receives the algorithm from the algorithm forming unit and permanently deletes the file data by executing the algorithm so that the file data can no longer be recovered.

2. The system of claim 1, wherein the parameters of the file are any of:
   a file extension;
   a file size.

3. The system of claim 1, wherein the algorithm forming unit selects the deletion rules from the rules database according to the user criteria.

4. The system of claim 3, wherein the user criteria is any of:
   required processing speed;
   priority of permanent deletion process;
   user specified file extensions;
   user specified file types; and
   user specified directories.

5. The system of claim 1, wherein the algorithm forming unit selects the deletion rules from the rules database according to location of the file data.

6. The system of claim 1, wherein a user is able to edit the rules and form a user proprietary deletion algorithm.

7. The system of claim 6, wherein, if the user proprietary deletion algorithm is less complex than the algorithm formed by the algorithm forming unit based on the parameters and the user criteria, the algorithm formed by the algorithm forming unit is used for deletion of the file data.

8. The system of claim 1, wherein the deletion rules are stored in a database.

9. The system of claim 8, wherein the rules database is periodically updated.

10. The system of claim 1, wherein the deletion algorithm performs overwriting of file-related data by any of:
    zeros;
    ones;
    a sequence of alternating zeros and ones;
    a sequence of alternating one and zeros; and
    a sequence of random bytes.

11. The system of claim 1, wherein the deletion algorithm performs several cycles of overwriting.

12. The system of claim 8, wherein the rules database contains the deletion rules based on any of:
    file parameters;
    location; and
    user criteria.

13. The system of claim 5, wherein the location is any of:
    a directory;
    a data storage type; and
    a data storage speed.

14. The system of claim 3, wherein the user criteria are any of:
    priority of processing speed; and
    priority of permanent deletion process for specified file extensions and specified directories.

15. The system of claim 1, wherein the deletion algorithm formed by the algorithm forming unit is represented as a formula, wherein each symbol in the formula represents an operation of data deletion.

16. The system of claim 1, wherein different deletion algorithms are formed based on the selected deletion rules.

\* \* \* \* \*